(12) United States Patent
Junginger

(10) Patent No.: US 12,092,741 B2
(45) Date of Patent: Sep. 17, 2024

(54) CONVERSION OF MEASURED DATA BETWEEN MEASUREMENT MODALITIES

(71) Applicant: Robert Bosch GmbH, Stuttgart (DE)

(72) Inventor: Andrej Junginger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 627 days.

(21) Appl. No.: 17/355,863

(22) Filed: Jun. 23, 2021

(65) Prior Publication Data
US 2021/0405181 A1    Dec. 30, 2021

(30) Foreign Application Priority Data
Jun. 25, 2020  (DE) .................... 102020207887.4

(51) Int. Cl.
G06K 9/00     (2022.01)
G01S 17/89    (2020.01)
G06T 17/00    (2006.01)

(52) U.S. Cl.
CPC .............. *G01S 17/89* (2013.01); *G06T 17/00* (2013.01); *G06T 2207/10* (2013.01)

(58) Field of Classification Search
CPC ..... G06T 17/00; G06T 2207/10; G06V 10/82; G06V 20/56; G06F 11/3664; G06F 11/3688; G06F 11/3696; G06F 18/00; G01S 17/89; G01S 13/90; G01S 13/931; G01S 7/2955; G06N 3/08; G06N 3/045; G06N 20/00
USPC ........................ 382/103, 107, 156, 232, 233
See application file for complete search history.

(56) References Cited

U.S. PATENT DOCUMENTS

| 2018/0247201 | A1 | 8/2018 | Liu et al. |
| 2019/0244107 | A1 | 8/2019 | Murez et al. |
| 2021/0327135 | A1* | 10/2021 | Borovikov ............ G06F 18/214 |
| 2021/0335039 | A1* | 10/2021 | Jones ..................... G06N 20/00 |

* cited by examiner

*Primary Examiner* — Duy M Dang
(74) *Attorney, Agent, or Firm* — NORTON ROSE FULBRIGHT US LLP; Gerard A. Messina

(57) ABSTRACT

A method for converting measured data of at least one source measurement modality into realistic measured data of at least one target measurement modality. The method includes: the measured data of the source measurement modality are mapped onto representations in a latent space using an encoder of a trained encoder-decoder arrangement, and the representations are mapped onto the realistic measured data of the target measurement modality using the decoder of the encoder-decoder arrangement, the amount of information of the representations of measured data in the latent space being smaller than the amount of information of the measured data.

15 Claims, 5 Drawing Sheets

CONVERSION OF MEASURED DATA BETWEEN MEASUREMENT MODALITIES

CROSS REFERENCE

The present application claims the benefit under 35 U.S.C. § 119 of German Patent Application No. DE 102020207887.4 filed on Jun. 25, 2020, which is expressly incorporated herein by reference in its entirety.

The present invention relates to the conversion of measured data of a source measurement modality into measured data of a target measurement modality, with which, for example, a control logic for a driving assistance system or a system for the at least semi-automated driving of a vehicle may be checked.

BACKGROUND INFORMATION

Driving assistance systems and systems for the at least semi-automated driving of a vehicle make decisions about driving maneuvers on the basis of sensory observations of the vehicle surroundings. The observations are recorded, for example, in the form of camera images, video images, heat images, ultrasonic images, radar data and LIDAR data. These raw signals are further processed in various levels of abstraction and also reduced in part to a common denominator.

For example, raw signals may be processed to initially form locations at which objects have been identified according to the measure of the appropriate sensor. The locations generated from the measured data of multiple sensors may be consolidated so that ultimately an overall image of the surroundings situation of the vehicle may be created in the form of a list of all the objects present there.

In order to be able to test in isolation and optimize the individual components of this processing chain, realistic signals of the respective intermediate stages are required. It is therefore desirable to be able to generate these realistic signals from a predefined test setting.

SUMMARY

Within the scope of the present invention, a method is provided for converting measured data of at least one source measurement modality into realistic measured data of at least one target measurement modality.

The term "measurement modality" in this case is not limited to physical contrast mechanisms with which measured data are obtainable. Different processing stages or levels of abstraction of measured data, for example, which represent a particular contrast mechanism, are also to be considered as different measurement modalities.

The term "measured data" is also not bound by the fact that a physical data recording actually takes place. Data that have been obtained via a simulation of a physical measuring process, as well as specifics of realistic settings (scenery), which are observable using such a measuring process, are also to be considered as measured data.

In accordance with an example embodiment of the present invention, the measured data of the source measurement modality are mapped onto representations in a latent space using an encoder of a trained encoder-decoder arrangement. The representations are mapped onto the realistic measured data of the target measurement modality using the decoder of the encoder-decoder arrangement.

In the process, in accordance with an example embodiment of the present invention, the amount (quantity) of information of the representations of measured data in the latent space is smaller than the amount (quantity) of information of the measured data. The measured data are thus compressed to form a smaller amount of information. The concept of amount of information is to be understood in terms of the Shannon information theory as the minimum number of bits or other parameters that are required in order to transfer the measured data or their representations.

For example, a compression of the measured data may be forced onto a smaller amount of information in that the dimensionality of the latent space
- is both smaller than the dimensionality of the space from which the encoder obtains the measured data of the source measurement modality,
- as well as smaller than the dimensionality of the space into which the decoder maps the measured data of the target measurement modality.

However, the latent space may also have in terms of form, for example, an equally large or even larger dimensionality than the space from which the encoder obtains the measured data of the source measurement modality, and the representation in the latent space may still have a smaller dimensionality than the measured data of the source measurement modality. Many of the parameters, for example, which characterize the representations in the latent space, may then be linked to one another or otherwise restricted by side conditions, boundary conditions and/or optimization criteria.

Similar to conventional auto-encoders, in which the decoder is to reconstruct the data originally fed to the decoder, the smaller amount of information of the representations in the latent space compared to the measured data forms a "bottle neck," through which the information must pass on the way from the encoder to the decoder. Because the decoder is now no longer intended to reconstruct the original data, but is to supply measured data to the target measurement modality, an advantageous division of work between encoder and decoder unexpectedly occurs during the training of the encoder-decoder arrangement: The encoder compresses the measured data of the source measurement modality in the representation to the essential information content regarding the setting to which these measured data relate, and omits the specifics regarding the source measurement modality, i.e., regarding the "glasses" through which this setting is seen in the measured data. The decoder adds the specifics regarding the target measurement modality to the compressed representation. Thus, the realistic measured data of the target modality supplied by the decoder indicate how the setting characterized by the compressed representation purged of the specifics of the source measurement modality is seen through the "glasses" of the target measurement modality.

The measured data of the target measurement modality thus obtained may be utilized in a variety of ways. If, for example, labeled measured data of the target measurement modality are required for the training of neural networks such as, for example, image classifiers, then these may be generated from labeled measured data of the source measurement modality while retaining the labels. It is then unnecessary to directly label the measured data of the target measurement modality. For example, it is then possible, in particular, to obtain measured data of multiple different target modalities from one and the same amount of labeled measured data of the source measurement modality.

For example, it is possible for images of traffic situations to have been manually labeled in terms of which type of object is located at which point. These images may then be converted, for example, into radar data or LIDAR data, which are then immediately correctly labeled. Thus, the labor input for the manual labelling does not have to be repeatedly invested. Beyond that, the labeling of images is to be carried out significantly faster and with less specialized knowledge than the labeling of radar data or LIDAR data.

The measured data of the target measurement modality may, however, also be utilized, for example, in order to specifically check particular parts or components of the processing chain described at the outset in driving assistance systems or systems for the fully or semi-automated driving of a vehicle. Thus, the measured data of the source measurement modality in one particularly advantageous embodiment contain a description of a setting including one or multiple objects. The measured data of the target measurement modality encompass locations in space, which a specific sensor, when physically observing the setting, would assign in each case to the objects in the setting. These places correspond to the above-mentioned "locations." A realistic description of a setting including particular objects is comparatively easy to create. In contrast, it would be significantly less intuitive to predict the "locations" based on such a description. The connection between the description of the setting and the "locations" is, however, amenable to machine learning.

The measured data of the target measurement modality may, for example, include, in particular, locations in space at which a specific radar sensor or a specific LIDAR sensor, when physically observing the setting, would register a radar reflex or a LIDAR reflex. This is the primary format in which these sensors output pieces of information about the setting.

The description of the setting may encompass, in particular, definitions, for example, of a plurality of geometric shapes in a plane or in space, each of which is considered to be occupied by an object. These geometric shapes may, in particular, be rectangles or cuboids, so-called "bounding boxes," for example. The association of locations to such a "bounding box" may be computationally checked particularly easily and quickly.

In one particularly advantageous embodiment of the present invention, the measured data of the source measurement modality are transformed into an input image or an input point cloud. The input image or the input point cloud is mapped by the encoder onto a representation in the latent space. The representation is mapped by the decoder onto an output image or an output point cloud. The output image or the output point cloud is finally transformed into the measured data of the target measurement modality.

This means that the encoder-decoder arrangement operates on the basis of images or of point clouds. It is possible, in particular, to further utilize or restructure an already existing arrangement that operates on the basis of images or of point clouds.

Moreover, it is in this way settable, for example, via the transformation of the output image or of the output point cloud into the measured data of the target measurement modality, how many ultimately ascertained locations these measured data of the target measurement modality indicate. This number is an important criterion, which also decides to what extent the measured data of the target measurement modality are understood by downstream algorithms as realistic. If the decoder supplies an output image, a variable number of points from this output image may be sampled, for example. An output point cloud may also be subsequently thinned out starting from a maximum number of points by randomly drawing from these points a certain number of points.

A description of the setting may, for example, be transformed into an input image on the basis of geometric shapes such as, for example, "bounding boxes" by discretizing the setting using a two-dimensional or three-dimensional grid and checking each grid point for whether it belongs to one of the geometric shapes defined in the description.

In the process, it may be noted in the grid, for example, for each grid point having a numerical value of 0 that this grid point is empty, or it may be noted with a numerical value of 1 that this grid point is occupied. The association of the object with a particular class may also be numerically coded. In addition, the grid points may also be assigned further numerical values for additional pieces of information such as, for example, for a material and/or a movement state of the object.

A description of the setting on the basis of geometric shapes such as, for example, "bounding boxes," may also be transformed, for example, into an input point cloud by drawing coordinates of points from a distribution and by adding each point that belongs to one of the geometric shapes to the input point cloud. The points may, for example, be located at edges and/or at surfaces of the geometric shapes, and/or they may completely fill these geometric shapes. Similar to the aforementioned grid points, additional numerical information about a class, a material (for example, a surface material), and/or about a movement state of the object, may also be numerically coded to these points. For example, these additional pieces of information may be encoded in additional coordinates of the points, so that these points are located in a space that includes more than three spatial dimensions.

In one further particularly advantageous embodiment of the present invention, measured data of multiple source measurement modalities are mapped by respective encoders onto representations in the latent space. These representations are mapped by one and the same decoder onto measured data of the target measurement modality. Thus, the decoder must only be trained once in order to be able to process measured data of various source measurement modalities.

Similarly, at least one representation in the latent space is mapped in one further particularly advantageous embodiment by at least two different decoders onto measured data of at least two target measurement modalities. Thus, if realistic measured data, for example, are to be generated, which a new sensor would have supplied for the same setting, then the encoder may remain unchanged, and merely one new decoder specific for the new sensor is to be trained.

As explained above, one important application of the above-described method is to generate realistic measured data of a target measurement modality for checking driving-dynamic systems. The present invention therefore also relates to a method for checking a control logic for a driving assistance system or for a system for the at least semi-automated driving of a vehicle.

Within the scope of this method, a description of a setting is provided including a predefined arrangement of objects as measured data of a source measurement modality. These measured data of the source measurement modality are converted into measured data of a target measurement modality using the above-described method.

The measured data of the target measurement modality thus obtained are fed as input to the control logic to be checked. A response proposed by the control logic based on this input is compared with a setpoint-response predefined for this setting. Based on the result of this comparison, it is evaluated to what extent the control logic is able to master the setting.

For example, there are numerous situations during the at least semi-automated driving of a vehicle, which have to be mastered by the control logic, regardless of how the situation in detail appears in reality. If, for example, the vehicle controlled by the control logic is on a collision course with another vehicle, all that matters is that an emergency brake application and/or a lane change is initiated. On the other hand, it is completely irrelevant which exact passenger vehicle model the other vehicle type is, which color or which surface material this vehicle has or what the weather is like at this moment. The control logic therefore does not operate with raw signals such as, for example, camera images, but with locations which pertain to the other vehicle according to a measure of a sensor.

An advantage of the test method provided herein is that the control logic may be checked in isolation. In a test during driving operation, in which sensors of the vehicle detect the natural setting, the proposed response is ultimately a function of both the detection and processing of the setting by the sensor as well as of the further processing by the control logic. If the proposed response does not correspond to the setpoint response, a poor quality of the raw signal detected by the sensor and a sub-optimal processing in the sensor, in addition to a sub-optimal processing in the control logic, are considered as causes of failure.

Converting a description of the setting into an input for the control logic using a physical or phenomenological model of the sensor eliminates the uncertainty with respect to the physical data recording.

A much larger class of settings may also be examined, since the setting does not have to occur in nature. In respect thereof, it is dependent on the accuracy of the modelling and thus difficult to guarantee that the input generated using the physical or phenomenological model of the sensor is actually realistic. If, in contrast, measured data of a target measurement modality are generated as input for the control logic using the above-described method, it is already ensured by the above-described training of the encoder-decoder arrangement that this input is realistic. The only unknown is then still the behavior of the control logic.

The present invention also relates to a method for training an encoder-decoder arrangement for use in one of the above-described methods.

In accordance with an example embodiment of the present invention, in this method, learning source measured data of at least one source measurement modality are provided, these learning source measured data representing predefined physical settings. Learning target measured data of at least one target measurement modality for the same physical settings are also provided.

The learning source measured data are mapped by the encoder-decoder arrangement initially onto representations in a latent space and from there onto measured data of the target measurement modality. According to a measure of a predefined cost function, it is assessed how well the measured data of the target measurement modality match the learning target measured data.

Parameters that characterize the behavior of the encoder, and/or parameters that characterize the behavior of the decoder are optimized with the aim that with further processing of learning source measured data by the encoder-decoder arrangement, the assessment of the then resultant measured data of the target measurement modality is presumably improved.

As explained above, the encoder learns in this type of training to adopt the essential information required for understanding the setting in compressed form into the representations and in the process to remove the specifics of the source measurement modality from the measured data. In contrast, the decoder learns to add the specifics of the target measurement modality to the generic representation in the latent space, so that the measured data supplied by it appear as if they had been detected or processed using this target measurement modality. How strongly pronounced this desired behavior is may depend, for example, on the relationship between the dimensionality of the latent space and the dimensionality of the space from which the encoder obtains the measured data of the first measurement modality and the dimensionality of the space into which the decoder maps. Thus, for example, the dimensionality of the latent space and/or another parameter, which establishes the amount of information of the representations in the latent space, may be utilized as a hyperparameter, which is also optimized during the training.

In one particularly advantageous embodiment of the present invention, the learning target measured data are transformed into a learning target image or a learning target point cloud. The match between an output image generated by the decoder or an output point cloud generated by the decoder and the learning target image or the learning target point cloud is graded as a match between the measured data of the target measurement modality and the learning target measured data. The cost function utilized for the training of the encoder-decoder arrangement may then directly assess the image generated by the decoder or the point cloud generated by the decoder without also having to take into consideration the effect of a transformation into the space of the measured data of the target measurement modality.

In this embodiment, the learning source measured data may, in particular, also be transformed into a learning source image or into a learning source point cloud, and the encoder-decoder arrangement may transform this learning source image or this learning source point cloud onto an image or a point cloud. An already existing encoder-decoder arrangement may then, for example, be further utilized unchanged for images or for point clouds.

Learning source measured data and learning target measured data may, in particular, be broken in, for example, within the scope of test drives with a vehicle that carries at least one sensor. For this purpose, the GPS position and the movement state of the vehicle, in addition to the measured data supplied by the sensor, may be recorded in order to ascertain sizes and positions of "bounding boxes."

The methods may, in particular, be fully or partially computer-implemented. The present invention therefore also relates to a computer program including machine-readable instructions which, when they are executed on one or on multiple computers, prompt the computer or the computers to carry out one of the described methods. In this sense, control units for vehicles and embedded systems for technical devices, which are equally able to execute machine-readable instructions, are also to be considered as computers.

The present invention also relates to a machine-readable data medium and/or to a download product including the computer program. A download product is a digital product transferrable via a data network, i.e., downloadable by a user of the data network, which may be offered for sale in an online shop for immediate download.

A computer may also be equipped with the computer program, with the machine-readable data medium or with the download product.

BRIEF DESCRIPTION OF THE DRAWINGS

Further measures improving the present invention are explained in greater detail below together with the description of the preferred exemplary embodiments of the present invention with reference to figures.

DETAILED DESCRIPTION OF EXAMPLE EMBODIMENTS

Figure 1:
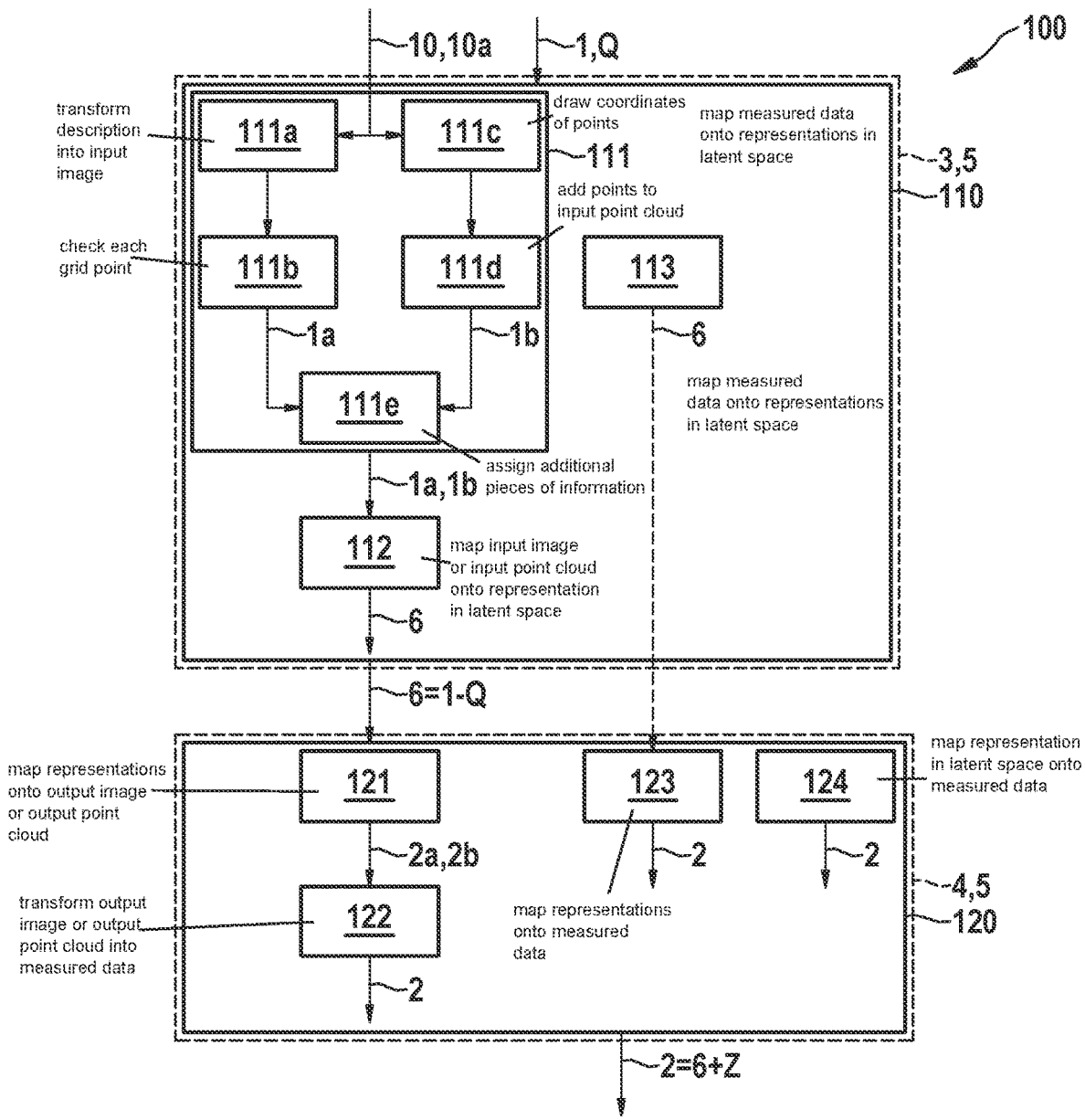
FIG. 1 shows an exemplary embodiment of method 100 for converting measured data 1 of a source measurement modality Q into realistic measured data of a target measurement modality Z, in accordance with the present invention.

FIG. 1 is a schematic flowchart of one exemplary embodiment of method 100 for converting measured data 1 of a source measurement modality Q into realistic measured data of a target measurement modality Z.

Measured data 1 are marked with the specifics of source measurement modality Q. These measured data 1 are mapped in step 110 using encoder 3 of a trained encoder-decoder arrangement 5 onto representations 6 in a latent space. These representations 6 are compressed as compared to the original measured data 1 and simultaneously purged of the specifics of the source measurement modality Q.

In step 120, representations 6 are mapped onto realistic measured data 2 of target measurement modality Z using decoder 4 of encoder-decoder arrangement 5. Measured data 2 are thus quasi "decompressed" from representations 6, and the specifics of target measurement modality Z are added.

According to block 111, measured data 1 of source measurement modality Q may be transformed into an input image 1a or an input point cloud 1b. According to block 112, input image 1a or input point cloud 6b may be mapped by encoder 3 onto a representation 6 in the latent space.

According to block 121, these representations 6 may be mapped by decoder 4 onto an output image 2a or onto an output point cloud 2b. In this case, it is also possible that representation 6 is generated by encoder 3 from an input image 1a and mapped by decoder 4 onto an output point cloud 2b. Encoder 3 must supply representation 6 merely in a format suitable for decoder 4. According to block 122, output image 2a or output point cloud 2b may then be transformed into measured data 2 of target measurement modality Z.

A description 10a of a setting 10, in particular, may be transformed into an input image 1a, for example, by discretizing setting 10 according to block 111a using a two-dimensional or three-dimensional grid and, according to block 111b, checking each grid point for whether it belongs to one of the geometric shapes defined in description 10a considered to be occupied by objects 11 through 13.

A description 10a of a setting 10 may, for example, be transformed into an input point cloud 1b by drawing according to block 111c coordinates of points from a distribution and, according to block 111d, adding each point belonging to one of the geometric shapes to input point cloud 1b.

According to block 111e, the grid points of input image 1a or the points of input point cloud 1b may be assigned additional pieces of information relating to the material, to a class and/or to the movement state of object 11 through 13 from description 10a of setting 10.

According to block 113, measured data 1 of multiple source measurement modalities Q may be mapped by respective encoders 3 onto representations 6 in the latent space. According to block 123, these representations 6 may be mapped by one and the same decoder 4 onto measured data 2 of target measurement modality Z.

According to block 124, at least one representation 6 in the latent space may be mapped by at least two different decoders 4 onto measured data 2 of at least two target measurement modalities Z.

Figure 2:
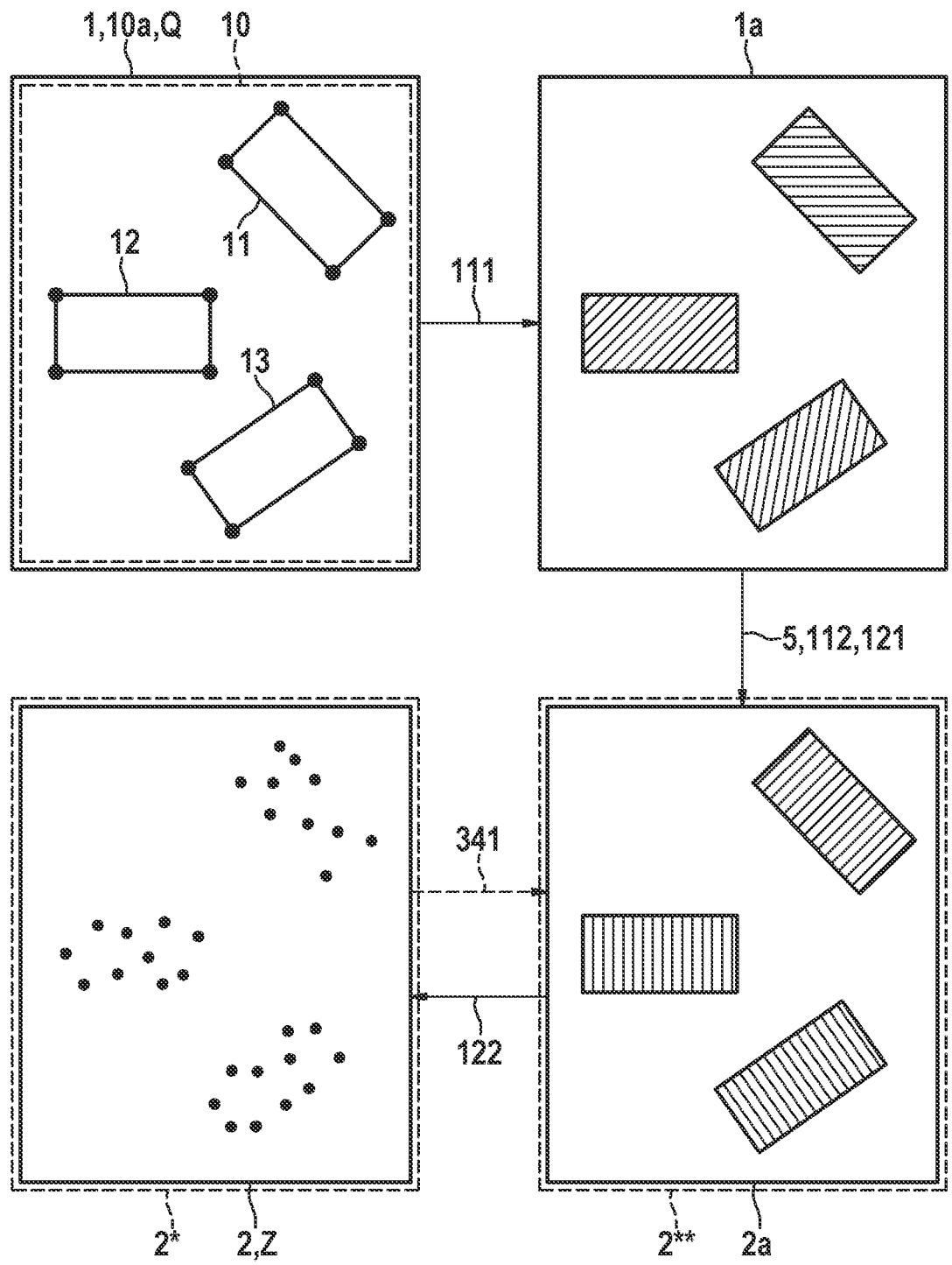
FIG. 2 shows an exemplary operation of method 100 via input image 1a and output image 2a, in accordance with the present invention.

FIG. 2 illustrates a first exemplary operation of method 100. Measured data 1 of source measurement modality Q encompass a description 10a of a setting 10 including three objects 11 through 13. Objects 11 through 13 are represented in this description by bounding boxes, which may be indicated, for example, in the form of their four vertices.

These measured data 1 are transformed according to block 111 into an input image 1a, in which, for example, the bounding boxes are depicted filled. The processing by the encoder-decoder arrangement 5 according to blocks 121 and 122 leads to an output image 2a, into which measured data 2 of target measurement modality Z are already encoded in image form. According to block 122, these measured data 2 of target measurement modality Z are extracted from output image 2a. In the example shown in FIG. 2, these measured data 2 encompass locations at which a predefined sensor identifies objects 11 through 13. These may be locations, for example, of radar reflexes or LIDAR reflexes.

Figure 5:
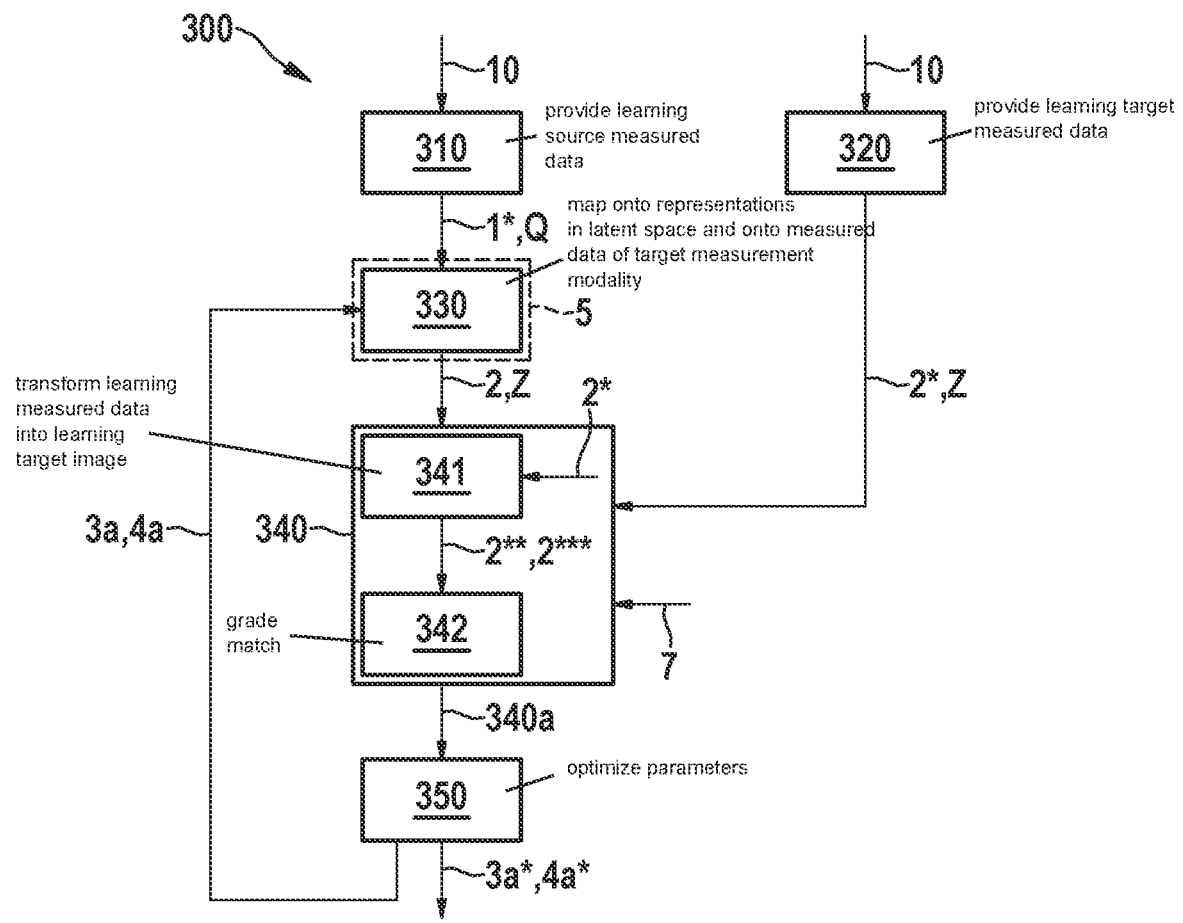
FIG. 5 shows an exemplary embodiment of method 300 for training an encoder-decoder arrangement 5, in accordance with the present invention.

As indicated by the dashed arrow, according to block 341 of method 300 shown in FIG. 5, learning measured data 2* are transformed into a learning target image 2** during the training of encoder-decoder arrangement 5, which is explained in greater detail in FIG. 5, so that output image 2a may be directly compared therewith.

Figure 3:
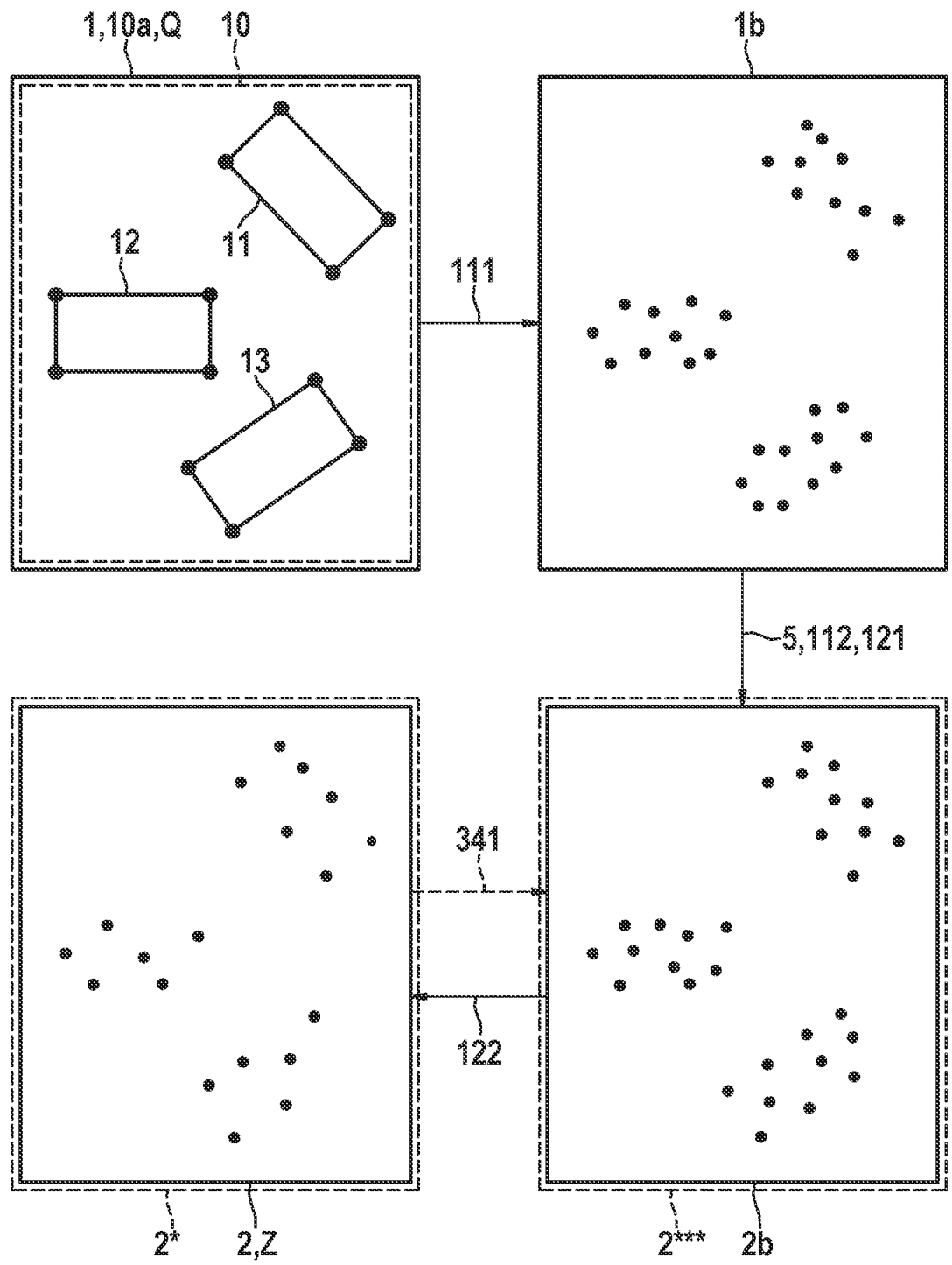
FIG. 3 shows an exemplary operation of method 100 via input point cloud 1b and output point cloud 2b, in accordance with the present invention.

FIG. 3 illustrates a second exemplary operation of method 100. Similar to FIG. 2, measured data 1 of source measurement modality Q encompass a description 10a of a setting 10 including three objects 11 through 13 in the form of bounding boxes. In contrast to FIG. 2, however, these measured data 1 are transformed according to block 111 into an input point cloud 11b. Accordingly, the processing by the encoder-decoder arrangement 5 according to blocks 112 and 121 provides an output point cloud 2b. According to block 122, this output point cloud 2b is transformed onto the searched measured data 2 of target measurement modality Z. In the example shown in FIG. 3, this transformation encompasses selecting just enough points from the points of output point cloud 2b so that measured data 2 corresponding to target measurement modality Z still appear realistic.

As indicated by the dotted arrow, according to block 341 of method 300 shown in FIG. 5, learning measured data 2* are transformed into a learning target point cloud 2*** during the training of encoder-decoder arrangement 5, which is explained in greater detail in FIG. 5, so that output image 2a may be directly compared therewith.

Figure 4:
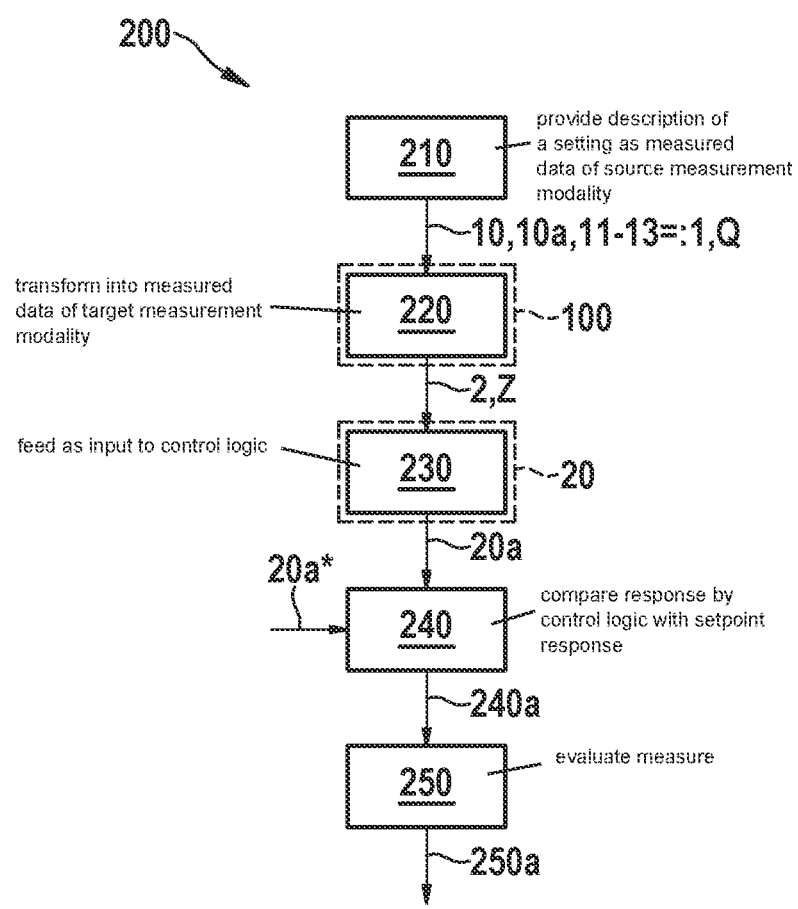
FIG. 4 shows an exemplary embodiment of method 200 for checking control logic 20, in accordance with the present invention.

FIG. 4 is a schematic flowchart of one exemplary embodiment of method 200 for checking a control logic for a driving assistance system or for a system for at least the semi-automated driving of a vehicle.

In step 210, a description 10a of a setting 10 including a predefined arrangement of objects 11 through 13, as it is shown, for example, in FIGS. 2 and 3, is provided as measured data 1 of a source measurement modality Q. These measured data 1 of source measurement modality Q are transformed in step 220 into measured data 2 of a target measurement modality Z using above-described method 100. These measured data 2 of target measurement modality Z are fed in step 230 as input to control logic 20 to be checked. A response 20a proposed by control logic 20 based on this input is compared in step 240 with a setpoint response 20a* predefined for setting 10. From result 240a of this comparison 240, a measure 250a is evaluated in step 250 as to what extent control logic 20 is able to master setting 10 such as, for example, a specific traffic situation.

FIG. 5 is a schematic flowchart of one exemplary embodiment of method 300 for training an encoder-decoder arrangement 5 for use in one of the above-described methods 100, 200.

In step 310, learning source measured data 1* are provided to at least one source measurement modality Q. These learning source measured data 1* represent predefined physical settings 10. In step 320, learning target measured data 2* of at least one target measurement modality Z are provided in parallel to the same physical settings 10.

In step 330, learning source measured data 1* are mapped by encoder-decoder arrangement 5 initially onto representations 6 in a latent space and from there onto measured data 2 of target measurement modality Z.

In step 340, an assessment 340a is ascertained according to a measure of predefined cost function 7 as to how well measured data 2 of target measurement modality Z match learning target measured data 2*.

For this purpose, learning target measured data 2* may be transformed, in particular, for example according to block 341, into a learning target image 2 or into a learning target point cloud 2*. According to block 342, the match between an output image 2a generated by decoder 4 or a point cloud 2b generated by decoder 4 and learning target image 2 or learning target point cloud 2* may then be graded as a match between the target measurement modality and the learning target measured data.

In step 350, parameters 3a, which characterize the behavior of encoder 3 and/or parameters 4a, which characterize the behavior of decoder 4, are optimized. The aim of this optimization is that with further processing of learning source measured data 1* by the encoder-decoder arrangement 5, the assessment 340a of the then resultant measured data 2 of the target measurement modality Z is presumably improved.

The training may be terminated if an arbitrary abort criterion is met. State 3a*, 4a* of parameters 3a, 4a then achieved is the fully trained state.

What is claimed is:

1. A method for converting measured data of at least one source measurement modality into realistic measured data of at least one target measurement modality, comprising the following steps:
    mapping the measured data of the source measurement modality onto representations in a latent space using an encoder of a trained encoder-decoder arrangement; and
    mapping the representations onto the realistic measured data of the target measurement modality using the decoder of the encoder-decoder arrangement, wherein an amount of information of the representations of measured data in the latent space is smaller than an amount of information of the measured data, wherein a dimensionality of the latent space is both smaller than a dimensionality of a space from which the encoder obtains the measured data of the source measurement modality, as well as smaller than a dimensionality of a space into which the decoder maps the measured data of the target measurement modality.

2. The method as recited in claim 1, wherein the measured data is measured data of multiple measurement modalities and are mapped by respective encoders onto representations in the latent space, and the representations are mapped by the same decoder onto measured data of the target measurement modality.

3. The method as recited in claim 1, wherein at least one representation in the latent space is mapped by at least two different decoders onto measured data of at least two target measurement modalities.

4. A method for converting measured data of at least one source measurement modality into realistic measured data of at least one target measurement modality, comprising the following steps:
    mapping the measured data of the source measurement modality onto representations in a latent space using an encoder of a trained encoder-decoder arrangement; and
    mapping the representations onto the realistic measured data of the target measurement modality using the decoder of the encoder-decoder arrangement, wherein an amount of information of the representations of measured data in the latent space is smaller than an amount of information of the measured data, wherein the measured data of the source measurement modality contain a description of a setting including one or multiple objects, and the measured data of the target measurement modality includes locations in space, which a specific sensor, when physically observing the setting, would assign in each case to the objects in the setting.

5. The method as recited in claim 4, wherein the measured data of the target measurement modality includes locations in space at which a specific radar sensor or a specific LIDAR sensor, when physically observing the setting, would register a radar reflex or a LIDAR reflex.

6. The method as recited in claim 4, wherein the description of the setting encompasses definitions of a plurality of geometric shapes in a plane or in space, each of which is considered to be occupied by an object.

7. The method as recited in claim 6, wherein:
    the measured data of the source measurement modality are transformed into an input image or into an input point cloud;
    the input image or the input point cloud is mapped by the encoder onto a representation in the latent space;
    the representation is mapped by the decoder onto an output image or onto an output point cloud; and
    the output image and/or the output point cloud are transformed into the measured data of the target measurement modality.

8. The method as recited in claim 7, wherein the description of the setting is transformed into an input image by discretizing the setting using a two-dimensional or three-dimensional grid and checking each grid point for whether it belongs to one of the geometric shapes defined in the description.

9. The method as recited in claim 8, wherein the grid points of the input image or the points of the input point cloud are assigned additional pieces of information relating to the material, to a class, and/or to a movement state of the object from the description of the setting.

10. The method as recited in claim 7, wherein the description of the setting is transformed into an input point cloud by drawing coordinates of points from a distribution and by adding each point that belongs to one of the geometric shapes to the input point cloud.

11. A method for checking a control logic for a driving assistance system or a system for at least the semi-automated driving of a vehicle, the method comprising the following steps:
   providing a description of a setting including a predefined arrangement of objects as measured data of a source measurement modality;
   transforming the measured data of the source measurement modality into measured data of a target measurement modality;
   feeding the measured data of the target measurement modality as input to the control logic to be checked;
   comparing a response proposed by the control logic based on the input with a setpoint response predefined for the setting;
   based on a result of the comparison, evaluating to what extent the control logic is able to master the setting.

12. A method for training an encoder-decoder arrangement, comprising the following steps:
   providing learning source measured data of at least one source measurement modality, the learning source measured data representing predefined physical settings;
   providing learning target measured data of at least one measurement modality for the same physical settings at the predefine physical settings;
   initially mapping the learning source measured data by the encoder-decoder arrangement onto representations in a latent space and from there onto measured data of the target measurement modality;
   assessing, according to a measure of one predefined cost function, how well the measured data of the target measurement modality match the learning target measured data;
   optimizing parameters that characterize a behavior of the encoder, and/or parameters that characterize a behavior of the decoder, the optimizing being with an aim that with further processing of learning source measured data by the encoder-decoder arrangement, the assessment of the then resultant measured data of the target measurement modality is improved.

13. The method as recited in claim 12, wherein the learning target measured data are transformed into a learning target image or into a learning target point cloud, and a match between an output image generated by the decoder or an output point cloud generated by the decoder and the learning target image or the learning target point cloud is graded as the match between the measured data of the target measurement modality and the learning target measured data.

14. A non-transitory machine-readable data medium on which is stored a computer program for converting measured data of at least one source measurement modality into realistic measured data of at least one target measurement modality, the computer program, when executed by a computer, causing the computer to perform the following steps:
   mapping the measured data of the source measurement modality onto representations in a latent space using an encoder of a trained encoder-decoder arrangement; and
   mapping the representations onto the realistic measured data of the target measurement modality using the decoder of the encoder-decoder arrangement, wherein an amount of information of the representations of measured data in the latent space is smaller than an amount of information of the measured data, wherein a dimensionality of the latent space is both smaller than a dimensionality of a space from which the encoder obtains the measured data of the source measurement modality, as well as smaller than a dimensionality of a space into which the decoder maps the measured data of the target measurement modality.

15. A computer configured to convert measured data of at least one source measurement modality into realistic measured data of at least one target measurement modality, the computer configured to:
   map the measured data of the source measurement modality onto representations in a latent space using an encoder of a trained encoder-decoder arrangement; and
   map the representations onto the realistic measured data of the target measurement modality using the decoder of the encoder-decoder arrangement, wherein an amount of information of the representations of measured data in the latent space is smaller than an amount of information of the measured data, wherein a dimensionality of the latent space is both smaller than a dimensionality of a space from which the encoder obtains the measured data of the source measurement modality, as well as smaller than a dimensionality of a space into which the decoder maps the measured data of the target measurement modality.

\* \* \* \* \*